United States Patent [19]

Chen

[11] Patent Number: 5,844,476
[45] Date of Patent: Dec. 1, 1998

[54] AUTOMOBILE DECELERATION INDICATING DEVICE

[76] Inventor: Shou-Shan Chen, No.39, Ma-Pu, Yueh-Mei Tsun Tung-Shih Hsiang, Yun-Lin Hsien, Taiwan

[21] Appl. No.: 786,976

[22] Filed: Jan. 24, 1997

Related U.S. Application Data

[63] Continuation-in-part of Ser. No. 637,831, Apr. 25, 1996, abandoned.

[51] Int. Cl.$^6$ ............................................. B60Q 1/50
[52] U.S. Cl. ..................... 340/467; 340/441; 340/464; 340/466; 340/479; 324/166; 324/174
[58] Field of Search .................................. 340/467, 441, 340/450, 453, 463, 464, 466, 471, 479; 73/514.16, 514.31; 324/161, 162, 163, 166, 173, 174, 175, 207.15, 207.16, 207.17

[56] References Cited

U.S. PATENT DOCUMENTS

3,601,794  8/1971  Blomenkamp ........................ 340/467
4,264,905  4/1981  Shapiro ................................. 324/174
4,305,072  12/1981  Makita .................................. 324/174
4,853,575  8/1989  Lessig, III ............................ 324/174
5,148,147  9/1992  Kobres ................................. 340/467
5,589,817  12/1996  Furness ................................ 340/467

*Primary Examiner*—Daniel J. Wu

[57] ABSTRACT

An automobile deceleration indicating device includes a signal generation unit which is coupled to the engine system for generating a signal of which the frequency is in general proportional to the operation speed of the engine, an amplifying circuit for amplifying the signal from the signal generation unit, a shaping circuit for generating a series of pulses from the amplified signal so that the frequency of the pulses representing the operation speed of the engine, and a micro-processor based circuit which receives the pulses and applies a control signal to the stoplight via power amplification circuit when the frequency of the pulses is decreased which indicates that the engine is slowed down.

2 Claims, 7 Drawing Sheets

AUTOMOBILE DECELERATION INDICATING DEVICE

CROSS REFERENCE TO RELATED APPLICATIONS

This application is a continuation-in-part of application Ser. No. 08/637,831, filed Apr. 25, 1996, now abandoned.

FIELD OF THE INVENTION

The present invention relates generally to a device for mounting on an automobile to automatically indicate the deceleration of a moving automobile and thus providing a warning to the drivers of the following automobiles.

BACKGROUND OF THE INVENTION

Automobiles have been widely used as efficient and convenient transportation means. Due to the fast speed that an automobile may move, it is important to timely indicate the deceleration of the automobile in order to avoid potential collisions by the following cars. Conventionally, automobiles are provided with stoplights on the rear side so that when the brake pedal is depressed to decelerate, a switch is triggered to turn on the stoplights. However, if the automobile is decelerated by for example releasing the accelerator pedal, the stoplight switch is not triggered and the stoplight is not turned on. Under this situation, the drivers of the following cars may not be aware of the deceleration of the front car immediately so that a potential risk of collision may be brought about.

It is thus desirable to provide an automobile deceleration indicating device which automatically indicates the deceleration of an automobile when the automobile is decelerated in any manner by sending out a warning signal to the drivers of the following cars.

SUMMARY OF THE INVENTION

The primary objective of the present invention is to provide a device which automatically detects the deceleration of an automobile and sends out a warning signal via for example the stoplights of the automobile.

Another object of the present invention is to provide an automobile deceleration indicating device which makes use of the variation in frequency of a series of pulses that is generated to correspond to the speed of the automobile to provide a warning signal via the stoplights of the automobile.

A further object of the present invention is to provide an automobile deceleration indicating device which comprises a pulse signal generation unit to be coupled to moving parts of the automobile, such as engine or transmission shaft, so that the frequency of the pulses represents the moving speed of the automobile and by making use of the variation of the frequency, the deceleration of the of the automobile can be detected and a warning signal generated.

To achieve the above objects, there is disclosed an automobile deceleration indicating device comprising a signal generation unit which is coupled to the engine system for generating a signal having a frequency generally proportional to the operation speed of the engine, an amplifying circuit for amplifying the signal from the signal generation unit, a waveform shaping circuit for generating a series of pulses from the amplified signal so that the frequency of the pulses represents the operation speed of the engine, and a micro-processor based circuit which receives the pulses and applies a control signal to the stoplights via power amplification circuit when the frequency of the pulses is decreased which indicates that the engine is slowed down.

BRIEF DESCRIPTION OF THE DRAWINGS

The above and other objects, advantages and features of the present invention will become apparent from the following description of the preferred embodiment thereof and the claims appended thereto, taken in conjunction with the accompanying drawings in which:

DETAILED DESCRIPTION OF THE PREFERRED EMBODIMENTS

Figure 1:
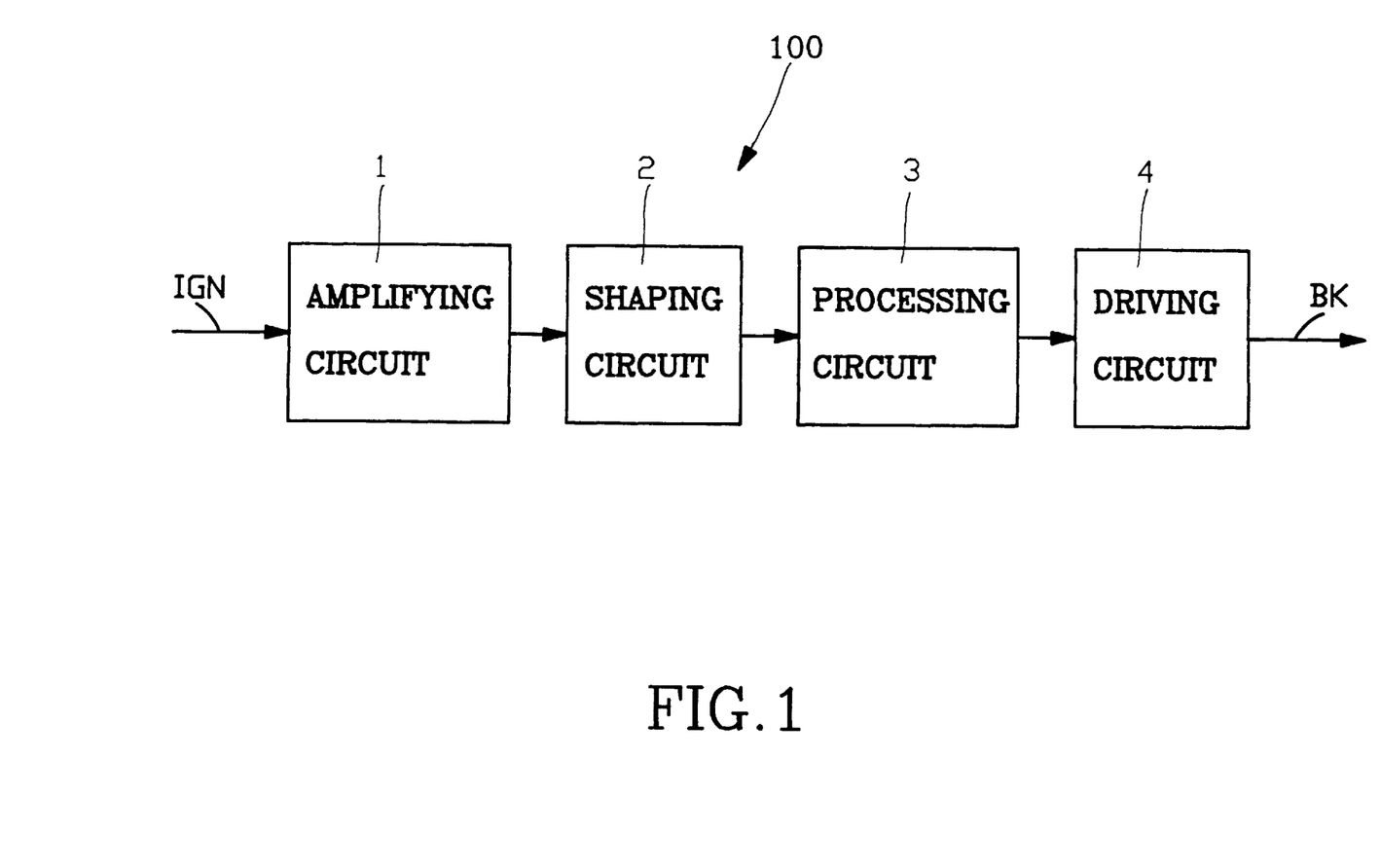
FIG. 1 is a circuit block diagram of the automobile deceleration indicating device constructed in accordance with the present invention.

With reference to the drawings and in particular to FIG. 1, wherein a control block diagram of an automobile deceleration indicating device constructed in accordance with the present invention, generally designated with reference numeral 100, is shown, the automobile deceleration indicating device 100 of the present invention comprises amplifying means 1 which receives a signal IGN from a signal generation unit coupled to moving parts of the automobile, such as engine system or transmission system, see FIGS. 3–7 which will be further discussed hereinafter, waveform shaping means 2 for shaping the amplified signal to provide a series of pulses having a frequency variable in accordance with the operation speed of the moving parts of the automobile, processing means 3 for generating a control signal in response to the variation of the frequency of the pulses and driving means 4 which, in response to the control signal generated by the processing means 3, generates a signal BK for turning on the stoplights of the automobile (not shown).

In accordance with the present invention, the IGN signal comprises a plurality of waves of varying amplitudes. These waves have frequency determined by the operation speed of the moving parts of the automobile that may represent the speed of the automobile. The faster the automobile, the higher the frequency of the waves of the IGN signal.

Figure 2:
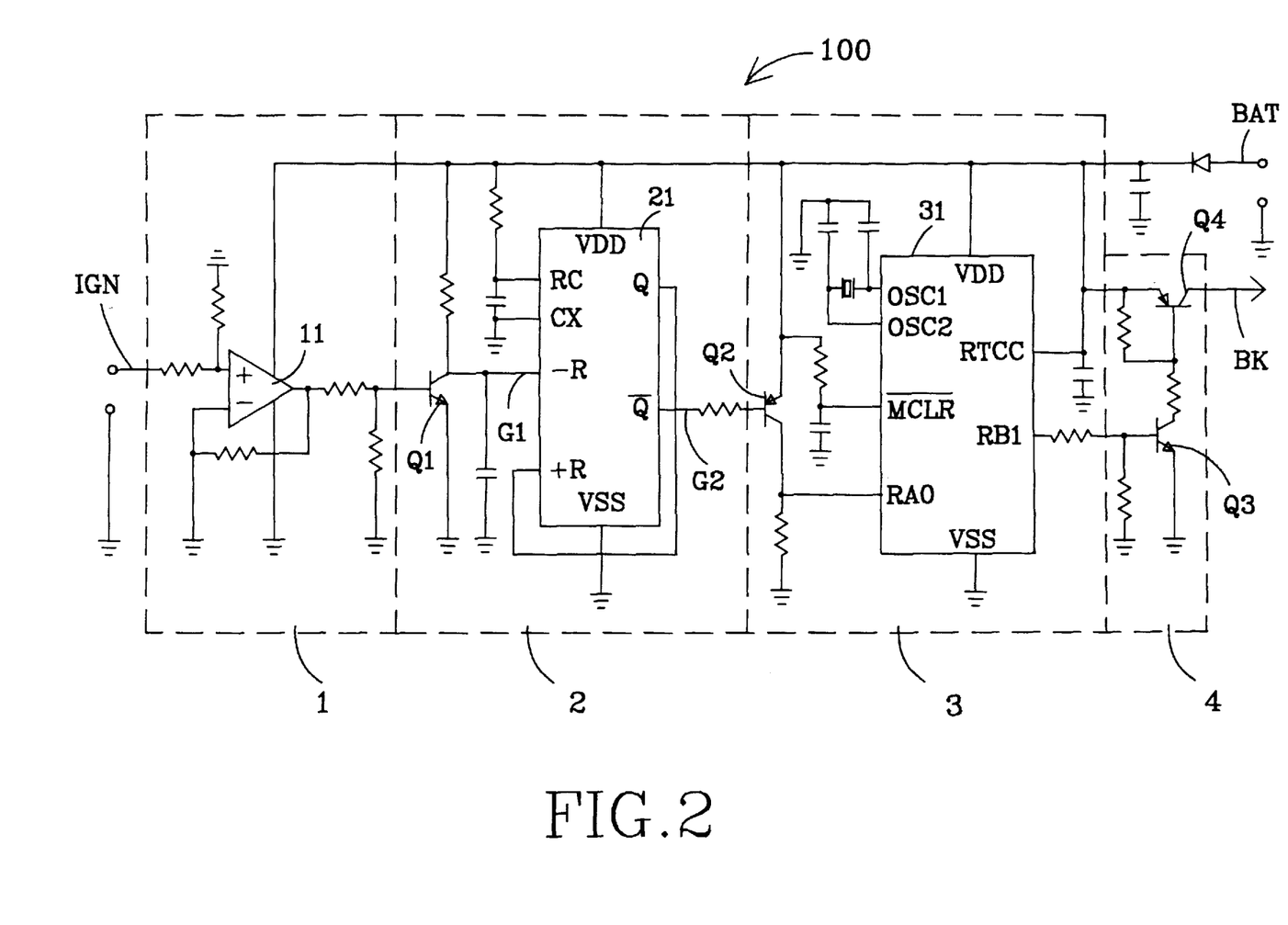
FIG. 2 is a circuit diagram of the automobile deceleration indicating device in accordance with the present invention.

Further referring to FIG. 2, which shows an example of circuit that corresponds to the block diagram of FIG. 1, the amplifying means 1 comprises an operational amplifier 11 which receives the IGN signal with its positive input terminal and resistors connected to the operational amplifier 11 in any known way to form an amplification circuit. The operational amplifier 11 may be a lower power operational amplifier selected from LM158 and LM258 series.

The output terminal of the operational amplifier 11 is connected to a transistor Q1 to have the output signal of the operational amplifier 11 further amplified and thus provide an output signal G1. The output signal G1 of the transistor Q1 is applied to the triggering input terminal–R of a retriggerable monostable multivibrator 21 which constitutes the waveform shaping means 2 to trigger the monostable multivibrator 21. The monostable multivibrator 21 serves to shape the waveform of the signal G1 so as to provide a shaped signal G2 at the inverted output terminal/Q thereof. The shaped signal G2 comprises a series of square or rectangular waves that form pulses. The frequency of the pulses is dependent upon the frequency of the waves of the IGN signal which as indicated previously is dependent upon the speed of the automobile. The series of pulses are then applied to the processing means 3.

The processing means 3 comprises a second transistor Q2 to which the pulse signal G2 is applied. The second transistor Q2 provides inversion operation on the pulse signal G2 and applies the inverted signal to an input terminal MCLR of a micro-processor 31 generates a control signal to the driving means 4 when the frequency of the pulses G2 is being decreased.

The driving means 4 comprises transistors Q3 and Q4 connected in any known way to do power amplification of the control signal so as to generate the signal BK that is sufficient to drive the stoplights of the automobile (not shown).

In the following discussion, devices for generating the signal IGN corresponding to the speed of the moving parts, such as engine of the automobile, are illustrated.

Figure 3:
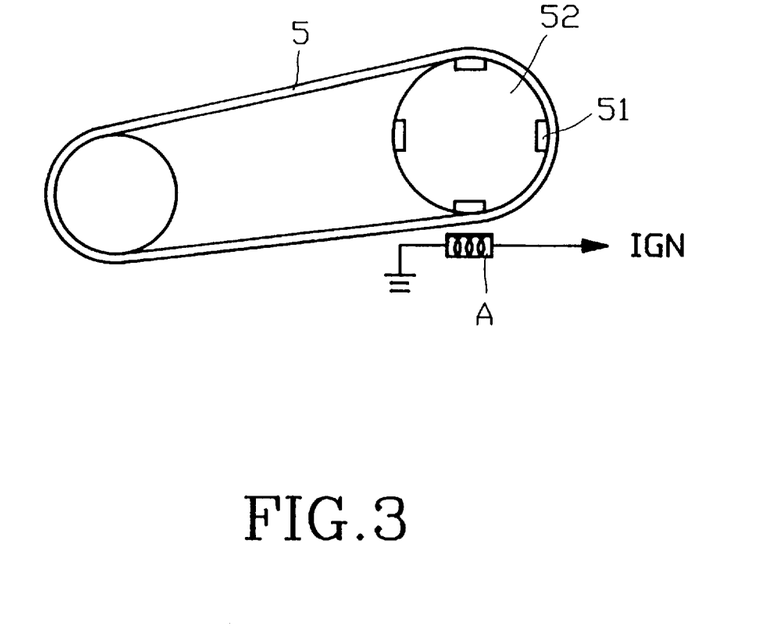
FIG. 3 is a schematic view showing a first embodiment of the pulse signal generation unit adapted in the automobile deceleration indicating device in accordance with the present invention.

In FIG. 3, a first embodiment of the signal generation unit that generate the signal IGN in accordance with the present invention is illustrated, wherein the signal generation unit comprises a plurality of transmitting elements 51 mounted along a circumference of a pulley 52 which drives a belt 5 of an receiving element A which is disposed at a location sufficiently close to the pulley 52 so that each time when one of the transmitting elements 51 passes through the receiving element A, a signal transmitted from the transmitting element 51 is receivable by the receiving element A which in turn generates a wave. In the operation of the engine, the transmitting elements 51 sequentially pass through the receiving element A and thus a series of waves are generated by the receiving elements A to form the signal IGN. The faster the belt 5 rotates, the higher the frequency of the signal IGN. As in known to mechanics, the speed of the belt 5 is corresponding, in some function relationship, to the speed of the automobile.

In the embodiment illustrated in FIG. 3, there are four transmitting elements 51 mounted on the pulley 52 in an equally-spaced manner along the circumference thereof. The transmitting elements 51 may each comprise a magnet which generates a magnetic field of pre-determined strength around it and the receiving element A may be a coil or solenoid so that when the magnets of the transmitting elements 51 pass through the coil A, an electrical current is generated in the coil A. This provides the signal IGN.

Figure 4:
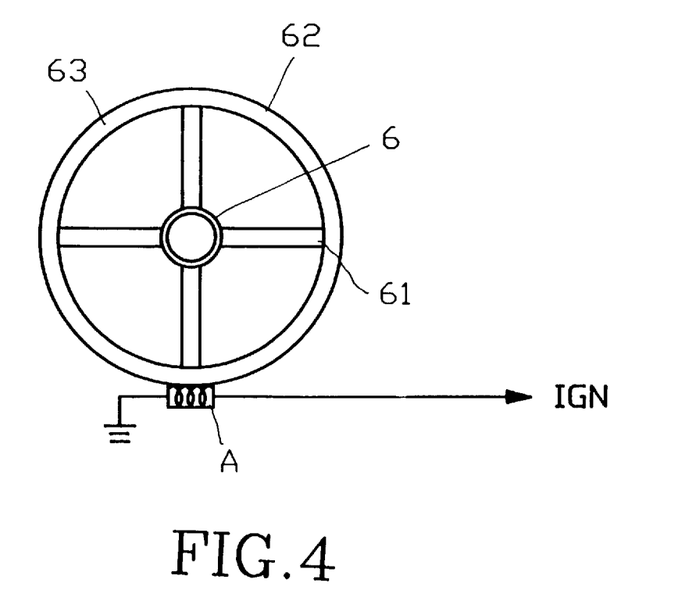
FIG. 4 is a schematic view showing a second embodiment of the pulse signal generation unit adapted in the automobile deceleration indicating in accordance with the present invention.

In FIG. 4, a second embodiment for generating the signal IGN is illustrated, in which a circular casing 62 is fixed to the tachometer cable connecting port of the engine (not shown) in such a manner that a disk 63 that is concentrically arranged within the casing 62 is rotatable with a tachometer cable connecting spindle 6 in correspondence to the operation speed of the engine. The disk 63 has, fixed thereon on an angularly equally spaced manner, a plurality of transmitting elements 61, which in this embodiment is four and may each comprise a magnet as discussed in the embodiment of FIG. 3. A receiving element A, which may comprise a coil or solenoid, is fixed on the casing 62 so that when the magnets 61 are rotated with the disk 63 to pass through the receiving element A, a series of waves are generated, forming the signal IGN, of which the frequency is corresponding to the rotational speed of the disk 63 which is in turn proportional to the speed of the engine.

Figure 5:
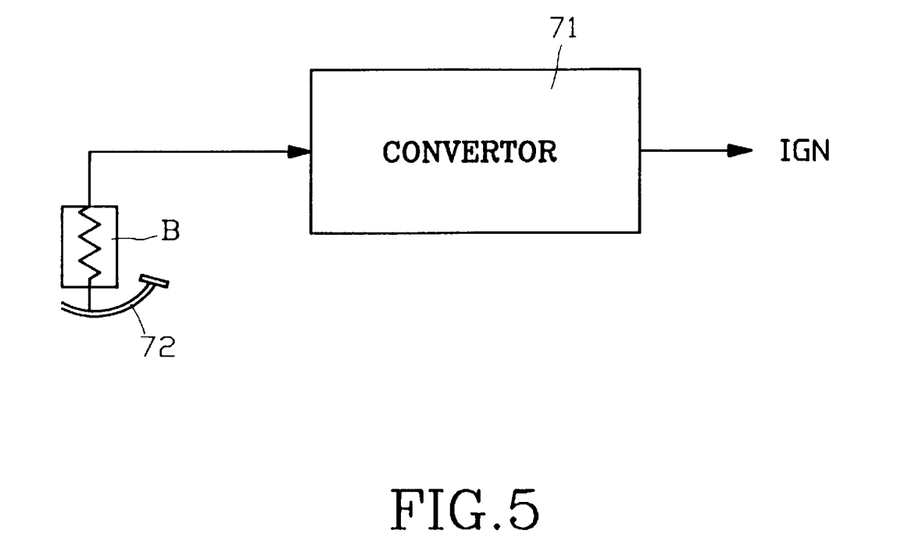
FIG. 5 is a schematic view showing a third embodiment of the pulse signal generation unit adapted in the automobile deceleration indicating device in accordance with the present invention.

Apparently, similar electromagnet sensing devices may also be adapted and mounted on for example transmission system, such as the drive shaft, odometer system, brake drum or wheel FIG. 5 shows a third embodiment for generating the signal IGN which comprises a sensor 8 connected to the accelerator pedal 72 of the automobile to generate an output signal which varies with the depression depth of the pedal 72. The sensor 8 may comprise a variable resistor of which the resistance varies with the depression depth of the pedal 72. A convertor 71 is connected to the output of the sensor 8 to convert the variation of resistance into a series of waves that constitute the signal IGN. The frequency of the output of the convertor 71 is proportional to the depression depth of the pedal 72 so that the deeper the pedal 71 is depressed, indicating the automobile is moving in a higher speed, the higher the output frequency of the convertor 71.

Figure 6:
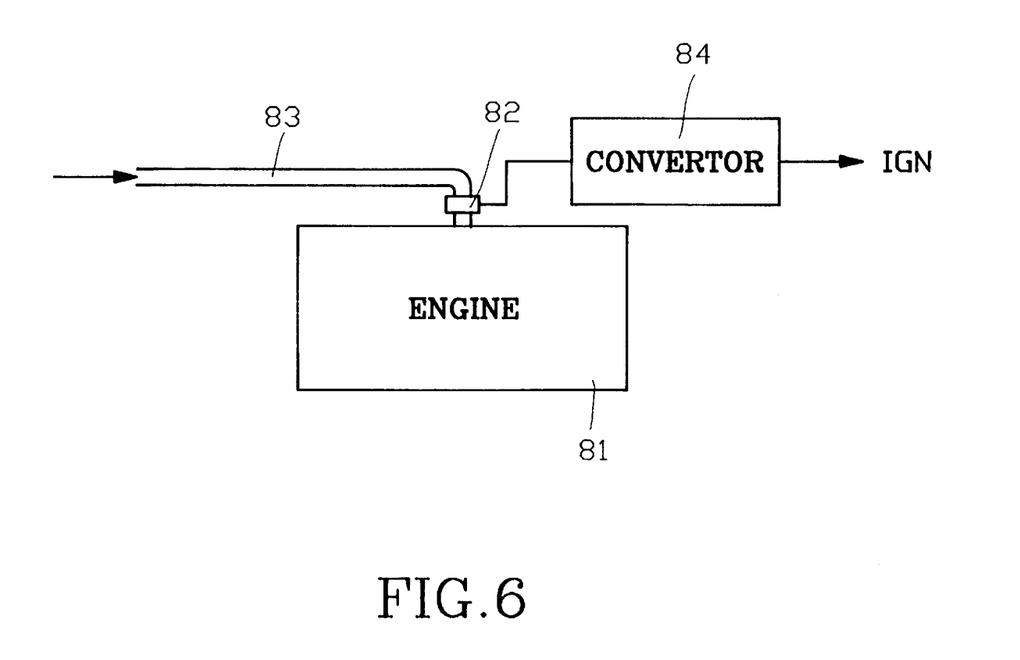
FIG. 6 is a schematic view showing a fourth embodiment of the pulse signal generation unit adapted in the automobile deceleration indicating device in accordance with the present invention.

FIG. 6 shows a fourth embodiment for generating the signal IGN which comprises a vacuum/pressure sensor 82, such as the well known diaphragm type vacuum sensor, connected to the air inlet passage 83 of the engine 81. A convertor 84 is provided to convert the output signal of the vacuum sensor 82 into the signal IGN. The vacuum level within the air inlet 83 of the engine 81 is directly related to the operation condition of the engine 81 which in turn determines the speed of the automobile.

Figure 7:
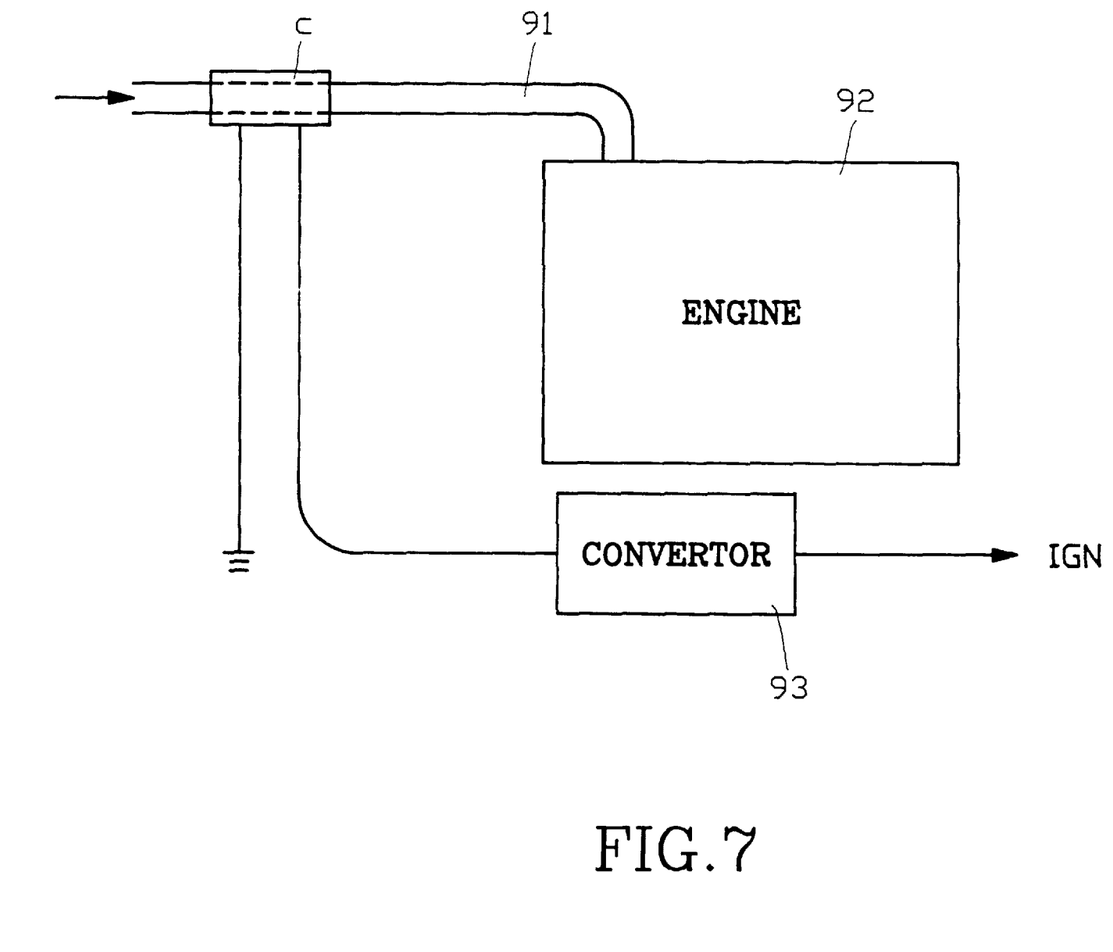
FIG. 7 is a schematic view showing a fifth embodiment of the pulse signal generation unit adapted in the automobile deceleration indicating device in accordance with the present invention.

FIG. 7 is a fifth embodiment for generating the signal IGN which comprises a flow rate/hydro-pressure sensor C mounted on the fuel passage 91 of a diesel engine 92. The faster the engine 92, the higher the fuel pressure within the passage 91. A convertor 93 is provided to convert the output of the sensor C into the signal IGN.

Figure 8:
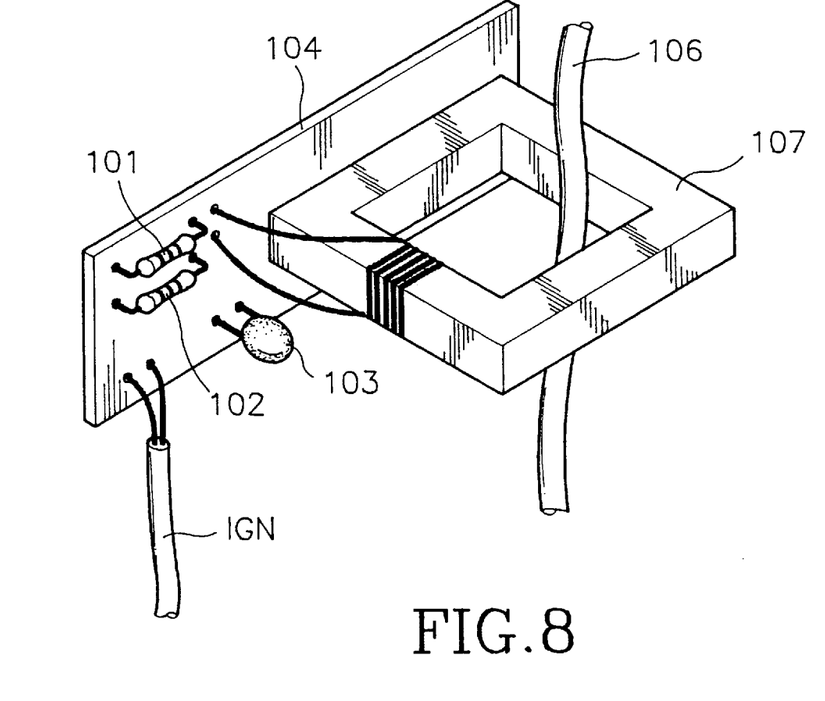
FIG. 8 is a perspective view showing a sixth embodiment of the pulse signal generation unit adapted in the automobile deceleration indicating device in accordance with the present invention.

FIG. 8 is a perspective view showing the sixth embodiment of the present invention for generating the signal IGN which is supplied to the automobile deceleration indicating device 100 as shown in FIG. 2. The pulse signal generation unit of this embodiment mainly comprises a printed circuit board 104 and a magnetic core 107 which is mounted on the printed circuit board 104.

The magnetic core 107 is arranged to surround the high voltage ignition cable 106 which is connected to the engine of an automobile. A coil 105 is winded on the magnetic core 107 for detecting the high voltage ignition signal of the high voltage ignition cable 106. So, the magnetic core 107 and the coil 105 together serves as an ignition detecting sensor.

A waveform pre-shaping circuit composed of two rectified diodes 101 and a capacitor 103 is arranged on the printed circuit board 104 and is electrically coupled to the coil 105 for shaping the high voltage signal generated from the coil 105. The output signal of the pre-shaping circuit is then sent to the automobile deceleration indicating device 100 as shown in FIG. 2.

Figure 9:
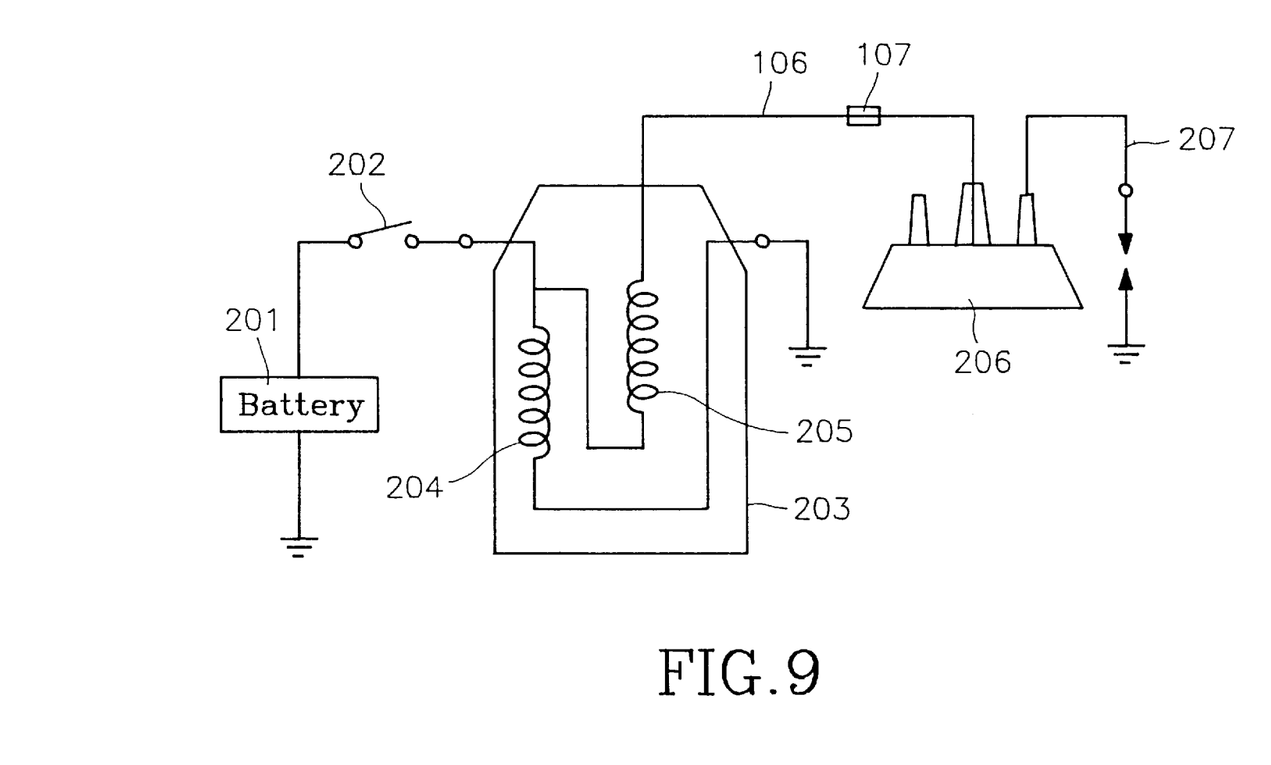
FIG. 9 is a schematic diagram showing the magnetic core of FIG. 8 is arranged to surround the high voltage ignition cable of the ignition system of an automobile.

FIG. 9 is a schematic diagram showing the magnetic core 107 shown in FIG. 8 is arranged to surround the high voltage ignition cable 106 of the ignition system of an automobile. The ignition system includes a battery 201, an ignition switch 202, an engine 203, a distributor 206, a high voltage ignition cable 106, and a high voltage sparking cable 207. The engine 203 includes a low voltage coil 204 and a high voltage generating coil 205. The high voltage ignition cable 106 is connected between the distributor 206 and the high voltage generating coil 205 of the engine 203. The high voltage sparking cable 207 is connected to the spark plug of the automobile. Preferably, the magnetic core 107 is arranged to surround the high voltage cable 107 as shown in FIG. 9. Alternatively, the magnetic core 107 may be arranged to surround the high voltage sparking cable 207.

It is apparent that although the invention has been described in connection with preferred embodiments and the preferred operation models thereof, it is contemplated that those skilled in the art may make changes to the preferred embodiments without departing from the scope of the invention as defined in the appended claims.

What is claimed is:

1. An automobile deceleration indicating device comprising signal generation means for generating a first signal comprising a number of waves having a frequency representing operation speed of the moving parts of the automobile and control means for generating a second signal in response to the first signal in order to provide a visual warning, the control means comprising:

amplifying means for receiving and amplifying the first signal and providing an amplified signal;

waveform shaping means for shaping the waves of the amplified signal in order to provide a series of pulses that have a frequency representing the operation speed of the moving parts of the automobile; and processing means which receives the pulses and generates the second signal in response to a decreasing of the frequency of the pulses and wherein an output signal from a pulse signal generating unit comprising a magnet core surrounding a high voltage ignition cable of said automobile is sent to said deceleration indicating device.

2. An automobile deceleration indicating device of claim 1, wherein the automobile includes a high voltage ignition cable and a low voltage coil and the magnet core surrounds the high voltage cable.

* * * * *